United States Patent Office 3,042,644
Patented July 3, 1962

3,042,644
VINYLIDENE POLYMER PLASTISOLS AND
METHOD OF PREPARING SAME
Elmer E. Cowell, Webster Groves, Mo., and Joseph R. Darby, St. Louis, Mo., assignors to Monsanto Chemical Company, St. Louis, Mo., a corporation of Delaware
No Drawing. Filed Nov. 28, 1958, Ser. No. 776,671
19 Claims. (Cl. 260—31.8)

This invention relates to plastisols and specifically to a method for reducing the viscosity of plastisols as well as the plastisol compositions.

"Plastistol" is a term adapted by the art to which this invention pertains to designate a colloidal dispersion of vinylidene halide polymer of microscopic ultimate particle size in liquid plasticizers therefor. It is 100% total solid material and is not to be confused with organosols which contain volatile solvents or thinners (Modern Plastics, vol. 29, page 87, December 1951).

Plastisols are prepared by dispersing the solid vinylidene halide polymer in a liquid plasticizer by means which are well known to those skilled in the art, as for example by the use of paint mixers, pony mixers or common agitation equipment. At the same time pigments, fillers and like compounding materials are usually incorporated. The resultant compounded plastisols are of a viscous nature and in appearance vary from viscous liquids to pasty materials.

The plastisols are frequently employed in making hollow molded elastomeric articles of various wall thicknesses. This is accomplished either by placing the plastisol in a hollow mold or by dipping a one-piece male mold into the plastisol. Plastisols are also employed in the "no-mold" molding technique, as for example in covering automotive light socket assemblies with a snug dust-and-water resistant removable cover by simply immersing the assembly in a plastisol to the proper depth. The plastisol coating resulting from any of these molding techniques is fused to an elastomeric compound by heating while in or on the mold. The usual fusion or fluxing temperature of plastisols is in the range of 300° F. to 400° F., the fusing or fluxing of the component parts is practically instantaneous. Upon cooling, the finished molded articles can be removed from the mold and are ready for use, or in case of a coated assembly, the assembly is ready for installation or packing.

It is apparent that for optimum use in molding, the plastisols must have an element of fluidity so that they can be poured, sucked or pumped into molds or so that they will flow around articles to be coated. Usually, when freshly prepared, the viscous liquid plastisols, that is those containing about 60 to 150 parts by weight of plasticizer for each 100 parts by weight of resin, are sufficiently fluid so that they can be employed to fill molds, or in the dip molding process.

However, the viscosity of such liquid plastisols increases on standing. This increase in viscosity means that the plastisol can no longer be sucked or poured into molds or that a greatly increased power input is required to pump them into molds. This increase occurs in but a few days after being prepared as hereinafter will be demonstrated.

The pasty plastisols, that is those containing from about 25 to about 60 parts by weight of plasticizers per 100 parts by weight of resin, are used in molding and also increase on standing. When they are used in dip molding, pasty plastisols of increased viscosity produce a non-uniform and uneven coating. Although plastisols having a viscosity above 20,000 centipoises have been used, those having a viscosity substantially below 20,000 are certainly preferred, e.g. 10,000 to 12,000 centipoises at 25° C.

Since molding with a plastisol is intended to provide an inexpensive rapid method for producing a uniformly tailored molded protective coating at low cost, it is extremely important that the viscosity of the plastisol be maintained within reasonably usable values even after the plastisol is seven to fourteen days old. When the viscosity increases beyond the usable limit, it is apparent that the user thereof will suffer a loss or be put to additional expense in returning the plastisol to a usable material. Thus, it is readily apparent that a plastisol which does not change appreciably in viscosity even after being stored for as long as two weeks would be an exceedingly useful composition.

In accordance with this invention it has been found that the useful life of a plastisol containing a primary liquid plasticizer can be substantially increased by dissolving therein a liquid aromatic hydrocarbon mixture, obtained as the high boiling residue from the alkylation of benzene or a mononuclear aromatic hydrocarbon of the benzene series with a branched or straight chain olefin (or mixture of olefins) or with a branched or straight chain alkyl halide or mixture of alkyl halides, containing 9 to 18 carbon atoms. A particularly useful and economical high boiling residue is that obtained when an aromatic hydrocarbon of the benzene series is condensed with an acyclic propylene polymer containing 9 to 18 carbon atoms, and then distilled to remove the benzene, intermediate fraction and the monoalkylated fraction, leaving behind the high boiling residue. The high boiling residues obtained when a $C_{12}$ to $C_{18}$ acyclic propylene polymer is employed are preferred for the purposes of this invention. The major component of these propylene polymers has the general structure

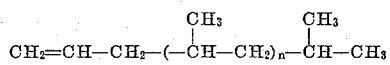

wherein $n$ is an integer of from 1 to 4 inclusive. These propylene polymers upon condensation with an aromatic hydrocarbon, such as benzene or a member of the benzene series, provide a mixture of mono-alkylated products of which the major component may be represented by the following structural formula

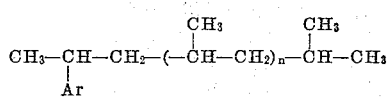

wherein Ar represents an aromatic nucleus derived from a member of the benzene series, such as phenyl, tolyl, xylyl and where $n$ is an integer of from 1 to 4. The preparation of such aryl alkanese is well known and is ordinarily carried out at relatively low temperatures in the presence of an alkylation catalyst.

Many types of catalysts have found use in the alkylation reaction including the better known Freidel-Crafts catalysts, for example, aluminum chloride, a combination of aluminum chloride and HCl, aluminum bromide and ferric chloride. Zinc, tin and titanium chlorides, boron halides, sulfuric acid, hydrofluoric acid, phosphoric acid and mixtures of these acids, e.g. sulfuric and phosphoric acid, are also used. Also frequently used are solid absorbent catalysts comprising oxides of the metals of the group 3B or 4A of the periodic system in combination with silica oxide. Still other catalysts often used are the metal pyrophosphates.

As illustrative of another useful and economical high boiling residue there may be mentioned the high boiling residue obtained from the reaction product resulting when benzene or an aromatic hydrocarbon of the benzene series is mono-alkylated with the product obtained by substantial mono-chlorination of paraffin base fractions, the said high boiling mixture being the residue left in the still pot after the excess benzene, intermediate fraction and mono-alkylated benzene fraction are removed by distillation. The said paraffin base fractions are obtained from Pennsylvania base oil and are often termed paraffin base kerosenes. In general, such kerosene fractions distill between 150° C. and 300° C., but preferably in the range of 190° C. to 250° C., and contain 10 to 16 carbon atoms to the molecule and usually average 12 carbon atoms per molecule.

The high boiling liquid aromatic hydrocarbon mixtures of this invention consist essentially of mono- and poly-alkylated benzene (or mono-nuclear aromatic hydrocarbons of the benzene series), alkylated diphenyl (or alkylated diaryl compounds of the benzene series) and diphenyl alkanes (or diaryl alkanes, in which the aryl portion is derived from a mono-nuclear aromatic hydrocarbon of the benzene series). For the purpose of brevity these high boiling liquid aromatic hydrocarbon mixtures will be hereinafter referred to as "HBHC."

The plasticizers which are useful in the compositions of this invention are those which will not dissolve the dispersion type resin at ordinary temperatures, but which will dissolve the resin at elevated temperatures and form a gel on cooling. Plasticizers which are commonly employed in the preparation of plastisols, frequently referred to as primary liquid plasticizers, include for example: the diesters of phthalic acid, such as dibutyl phthalate, diamyl phthalate, di-(2-ethylhexyl) phthalate, dicyclohexyl phthalate, butyl isodecyl phthalate, diisoctyl phthalate, di-(n-octyl) phthalate, and mixtures thereof; the triaryl phosphates such as triphenyl phosphate, tricresyl phosphate, and cresyl diphenyl phosphate; the alkyl aryl phosphates having from 6 to 18 carbon atoms in the alkyl groups, such as hexyl diphenyl phosphate, 2-ethylbutyl diphenyl phosphate, octyl diphenyl phosphate, 2-ethylhexyl diphenyl phosphate, isooctyl diphenyl phosphate, nonyl diphenyl phosphate, decyl diphenyl phosphate, 2-butyloctyl diphenyl phosphate, tridecyl diphenyl phosphate, tetradecyl phenyl phosphate, octadecyl diphenyl phosphate, 2-ethylbutyl dicresyl phosphate, n-octyl dicresyl phosphate, isooctyl dicresyl phosphate, 2-ethylhexyl dicresyl phosphate, nonyl dicresyl phosphate, decyl dicresyl phosphate, 2-n-propylheptyl dicresyl phosphate, 2-butyl octyl dicresyl phosphate, tridecyl dicresyl phosphate, tetradecyl dicresyl phosphate, and octadecyl dicresyl phosphate; the liquid esters of aliphatic dicarboxylic acids such as dibutyl sebacate, dihexyl adipate, di(1,3-dimethyl butyl) adipate, dinonyl adipate, octyldecyl adipate; the chlorophthalates, such as di(2-ethylhexyl) monochlorophthalate and di(2-ethylhexyl) dichlorophthalate; other high boiling esters and the like. These plasticizers may be mixed with each other or with one or more secondary plasticizers, such as the hydrocarbon types, which are well known to those skilled in the art of preparing plastisols.

The vinylidene halide resins which can be used in accordance with this invention includes, among others, dispersion type resins derived from such vinylidene compounds as vinyl chloride, vinylidene chloride, etc. and copolymers of such vinylidene compounds with other ethylenically unsaturated monomers co-polymerizable therewith, for example, copolymers of a vinylidene halide such as vinyl chloride with such materials as vinylidene chloride, vinyl esters of carboxylic acids, e.g. vinyl acetate, vinyl propionate, vinyl butyrate, vinyl benzoate; esters of unsaturated acids, e.g. alkyl acrylates, such as methyl acrylate, ethyl acrylate, propyl acrylate, butyl acrylate, allyl acrylate and the corresponding esters of methacrylic and ethacrylic acids; vinyl aromatic compounds, e.g. styrene, ortho-chlorostyrene, parachlorostyrene, 2,5-dichlorostyrene, 2,4-dichloro-styrene, para-ethyl styrene, divinyl benzene, vinyl naphthalene, alpha methyl styrene; unsaturated amides, such as acrylic acid amides, acrylic acid anilide; unsaturated nitriles, such as acrylonitrile, methacrylonitrile; esters of $\alpha,\beta$-ethylenically unsaturated carboxylic acids, e.g., the methyl, ethyl, propyl, butyl, isobutyl, amyl, hexyl, heptyl, octyl, allyl, methallyl and phenyl monoesters and diesters of maleic, crotonic, itaconic, fumaric acids and the like. The class of copolymers in which a predominant proportion, i.e. more than 80% by weight of the monomer units are vinyl chloride units, any balance being monomer units derived from an ethylenically unsaturated monomer, represents a preferred class of resins to be in the compositions of this invention.

The "HBHC" compounds of this invention are also effective in plastisols of vinylidene halide resins containing halogens other than chlorine, e.g. bromine, iodine and fluorine.

The above vinylidene halide-containing dispersion type resins and their preparation are well known to those skilled in the art. They are usually prepared by a conventional aqueous emulsion polymerization technique which produces a latex-like dispersion of the vinylidene halide-containing resin. The polymer material is recovered from the latex-like dispersion by a coagulation or flocculation process as a fine powder. Vinylidene halide containing dispersion type resins having an average primary particle size (i.e. the particles as they exist in the latex form) in a wide range, as for example from about 0.02 to about 5.0 microns can be employed in practicing this invention; however those having an average primary particle size of from 0.02 to about 2 microns are preferred. The term "average particle size" as used hereinafter in the specification and claims should be understood to refer to the average primary particle size as defined above.

The following examples are intended to be illustrative of the present invention and are not intended as a limitation thereon. In these examples, the term "parts" is employed to indicate parts by weight.

In Examples A through O there are described various specific high boiling liquid hydrocarbon mixtures and the process by which they are obtained.

EXAMPLE A

A high boiling liquid aromatic hydrocarbon mixture (HBHC "A") having the following physical properties:

| | HBHC "A" |
|---|---|
| Refractive index (25° C.) | 1.4917 |
| Specific gravity (25/15.5° C.) | 0.8785 |
| Viscosity— | |
| 100° F. _____cs__ | 71.2 |
| 210° F. _____cs__ | 6.26 |
| Pour point _____° F__ | −15 |
| Flash point _____° F__ | 355 |
| Fire point _____° F__ | 415 |
| Molecular weight (apparent average) | 340 | is obtained from the reaction product resulting from the reaction of a propylene tetramer (B.P. 180–220° C.) with benzene (molar excess) in the presence of anhydrous aluminum chloride and dry hydrogen chloride gas (0.2–0.3 percent by weight of the reactants) at room temperature. The said high boiling residue being the material left in the still pot when the excess benzene, intermediate fraction and $C_{12}$ alkylbenzene are removed by distillation.

EXAMPLE B

A high boiling liquid aromatic hydrocarbon mixture is obtained in the same manner as the mixture of Example A, except that said mixture has the following physical properties:

HBHC "B"
Refractive index (25° C.) _____ 1.4917
Specific gravity (25/15.5° C.) _____ 0.8791
Viscosity—
   100° F. _____ cs__ 93.2
   210° F. _____ cs__ 7.36
Pour point _____ ° F__ −15
Flast point _____ ° F__ 395
Fire point _____ ° F__ 430
Distillation range (at 5 mm. Hg) [1]—
   1st drop _____ ° C__ 189
   50% _____ ° C__ 219
Molecular weight (apparent average) _____ 375

[1] The distillation data is obtained by placing 100 ml. of the high boiler residue in a flask to which there is attached a condenser. The vapor temperature at the top of the flask is taken at the time the first drop comes out of the condenser. The 50% point represents the vapor temperature at the time 50 ml. of distillate is collected (ASTM—Engler range).

EXAMPLE C

A high boiling liquid aromatic hydrocarbon mixture having the following properties:

HBHC "C"
Appearance _____ Dark amber viscous liquid.
Refractive index (25° C.) _____ 1.4893.
Specific gravity (25/15.5° C.) _____ 0.872.
Distillation range (5 mm. Hg)—
   1st drop _____ 190° C.
   50% point _____ 243° C.
Molecular weight (apparent average)_ 335.

is obtained by reacting a commercial propylene tetramer (B.P. 186–206° C.) with benzene in the following manner:

1000 parts by weight of dried benzene and 11 parts by weight of commercial anhydrous aluminum chloride are charged into a closed reaction vessel provided with a stirring device capable of vigorously agitating said mixture. While said mixture is being agitated, a small amount (0.2 to 0.3 percent by weight of the total reactants) of anhydrous hydrogen chloride gas is introduced into the reaction vessel through a steam sparger located below the surface of the benzene until the evolution of hydrogen chloride gas is noted at the top of the reflux condenser. Three parts of active clay (Superfiltrol) are introduced into the reaction vessel while still maintaining vigorous agitation. Thereafter 320 parts by weight of propylene tetramer are slowly introduced over a period of about 20 minutes. The temperature of the reaction mixture is held at from about 30° C. to about 35° C. throughout the process by means of a cooling coil in the reaction vessel. Agitation is continued for about 15 minutes after all the olefin has been introduced. Agitation is terminated and the reaction mixture is allowed to stand for about 30 minutes during which time the catalyst complex settles and is separated from the alkylation mass. The alkylation mass is then washed with an equal volume of water at 25° C. and dried over calcium sulfate. The dried, washed alkylation liquor is then fractionated into four fractions consisting of: (1) excess benzene employed in the reaction, (2) the intermediate, (3) the dodecylbenzene, (4) the residue or high boiling fraction. The cut ranges are as follows: (1) benzene up to a vapor temperature of 115–120° C. at atmospheric pressure, then (2) intermediate up to a vapor temperature of 110–112° C. at 20 mm. mercury pressure, then (3) the dodecylbenzene fraction up to a temperature of 155–157° C. at 2 mm. mercury pressure, and (4) the residue.

EXAMPLE D

A high boiling liquid aromatic hydrocarbon mixture having the following physical properties:

HBHC "D"
Appearance _____ Dark amber viscous liquid.
Refractive index (25° C.) _____ 1.4890.
Specific gravity (25/15.5° C.) _____ 0.871.
Distillation range (5 mm. Hg)—
   1st drop _____ 203° C.
   50% _____ 230° C.
Molecular weight (apparent average)_ 330.

is obtained by employing the process described in Example C.

EXAMPLE E

A high boiling liquid aromatic hydrocarbon mixture having the following physical properties:

HBHC "E"
Appearance _____ Dark amber viscous liquid.
Refractive index (25° C.) _____ 1.4987.
Specific gravity (25/15.5° C.) _____ 0.876.
Distillation range (5 mm. Hg)—
   1st drop _____ 190° C.
   50% _____ 222° C.
Molecular weight (apparent average)_ 400.

is obtained by employing the process of Example C except that a mixture of branched chain olefins ($C_{12}$ to $C_{15}$, B.P. 200–260° C.) containing an average of 13 carbon atoms is used as the alkylating agent and three times the amount of catalyst is employed. After the tridecylbenzene fraction is distilled, there remains behind in the still pot a high boiling liquid aromatic hydrocarbon mixture (HBHC "E"). The apparent average molecular weight of an HBHC produced from a $C_{13}$ propylene polymer mixture varies within the range of 380–450.

EXAMPLES F, G, H, I, J, K

The following high boiling liquid aromatic hydrocarbon mixtures (having the indicated physical properties) are obtained by using the process described in Example C, except that the active clay is omitted and the high boiler fraction is recycled at the rate of about 15 parts by weight of high boiler per 100 parts by weight of olefin:

| HBHC | Refractive Index at 25° C. | Specific Gravity, 25/15.5° C. | Distillation Range at 5 mm. Hg | |
|---|---|---|---|---|
| | | | 1st drop | 50% |
| "F" | 1.4898 | 0.869 | 191 | 215 |
| "G" | 1.4890 | 0.873 | 195 | 228 |
| "H" | 1.4875 | 0.868 | 185 | 241 |
| "I" | 1.4880 | 0.869 | 205 | 230 |
| "J" | 1.4888 | 0.870 | 210 | 239 |
| "K" | 1.4892 | 0.878 | 214 | 245 |

The apparent average molecular weight of the above materials is within the range of 330–380.

EXAMPLE L

HBHC "L" a high boiling liquid aromatic hydrocarbon mixture is obtained from the reaction mixture resulting from the reaction at room temperature and in the presence of anhydrous hydrofluoric acid, of a commercial propylene pentamer with benzene to form a $C_{15}$ alkylbenzene derivative in which the pentadecyl substituent is principally

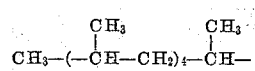

The reaction mixture is dried and then subjected to distillation. The HBHC "L" fraction represents that material left in the still pot after the excess benzene, intermediate fraction and $C_{15}$ alkylbenzene fraction are removed.

EXAMPLE M

The process of Example "L" is repeated except that boron trifluoride is substituted for the anhydrous hydrofluoric acid, and propylene hexamer is substituted for the propylene pentamer. Analysis indicates that the $C_{18}$ alkylbenzene produced has an octadecyl substituent which is principally

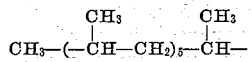

On distilling the excess benzene, intermediate fraction and $C_{18}$ alkylbenzene fraction from the reaction product, a high boiling liquid aromatic hydrocarbon mixture, HBHC "M," is obtained.

EXAMPLE N

The process of Example M is repeated except that a commercial propylene trimer (B.P. 107–144° C.) is substituted for the propylene hexamer of said example. Analysis indicates that the nonyl substituent in the $C_9$ alkylbenzene produced is principally

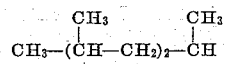

On distilling the excess benzene, intermediate fraction and $C_9$ alkylbenzene from the reaction mixture, a high boling liquid aromatic hydrocarbon mixture HBHC "N" is obtained.

EXAMPLE O

A high boiling liquid aromatic hydrocarbon mixture HBHC "O" is obtained in the following manner. Kerosene chloride obtained by introducing chlorine into the kerosene fraction until said fraction is substantially two-thirds chlorinated on a molar basis (said kerosene fraction boiling between 190° C. and 250° C. and consisting essentially of paraffinic hydrocarbons averaging 12 carbon atoms per molecule) is condensed with a substantially equimolecular proportion of benzene at room temperature and in the presence of a catalytic amount of aluminum chloride. On distilling the excess benzene, intermediate fraction and $C_{12}$ alkylbenzene from the reaction mixture there remains behind in the still pot a high boiling residue, hereinafter referred to as HBHC "O."

The compositions illustrating this invention are prepared by stirring together in the proportions indicated a dispersion type polyvinyl chloride resin, the plasticizer and the HBHC compound. The preparation of the plastisol composition is not recited in the following specific examples; rather, the formulation and the viscosity characteristics of the compositions at stated intervals are given.

EXAMPLE I

Table I

| Composition | PVC (Avg. Particle Size 0.7 Micron) Parts | Di-2-ethyl-hexyl phthalate Parts | HBHC "A," parts | HBHC "B," parts |
|---|---|---|---|---|
| Ia | 100 | 25 | 5 | |
| Ib | 100 | 50 | 10 | |
| Ic | 100 | 65 | | 13 |
| Id | 100 | 75 | 19 | |
| Ie | 100 | 75 | | 15 |
| If | 100 | 75 | 10 | |
| Ig | 100 | 75 | | 5 |
| Ih | 100 | 75 | 3 | |
| Ii | 100 | 80 | 2 | |
| Ij | 100 | 90 | | 10 |
| Ik | 100 | 100 | 10 | |
| Il | 100 | 100 | | 20 |
| Im | 100 | 75 | | |

The room temperature viscosities in centipoises of compositions Ie and Im are shown in Table II below:

Table II

VISCOSITY OF PVC PLASTISOLS IN CENTIPOISES

| Days after Preparing | Composition Ie | Composition Im |
|---|---|---|
| 0 | 5,500 | 6,500 |
| 1 | 6,000 | 9,000 |
| 2 | 6,500 | 10,000 |
| 3 | 7,000 | 10,700 |
| 4 | 7,500 | 11,500 |
| 5 | 8,000 | 12,500 |
| 7 | 9,000 | 14,000 |
| 9 | 10,000 | 16,000 |
| 11 | 10,800 | 18,000 |
| 14 | 11,000 | 20,000 |

It is clear from the above data that the viscosity of composition Im will be satisfactory for only 2 to 3 days after preparation, while that of composition Ie will be satisfactory for about 14 days after preparation.

EXAMPLE II

A plastisol composition is prepared which contains 100 parts of a dispersion type PVC, having an average particle size of about 0.8 micron, 75 parts of tricresyl phosphate and 15 parts of HBHC "B." The viscosity of this composition will be found to be within the usable range of 7 to 14 days after preparation. In about 4 days, the viscosity of a plastisol composition containing 100 parts of PVC and 75 parts of tricresyl phosphate will be high and thus it will become increasingly difficult to obtain a uniform continuous coating.

EXAMPLE III

A plastisol composition is prepared which contains 100 parts of a dispersion type resin having an average particle size of about 0.6 micron, obtained by copolymerizing in an aqueous emulsion system a mixture of monomers containing 85% by weight of vinyl chloride and 15% by weight of vinylidene chloride, 75 parts of di-(2-ethylhexyl)phthalate and 12 parts of HBHC "B." The viscosity of this plastisol does not increase appreciably 5 days after preparation. In contrast a plastisol composition containing 75 parts of di-(2-ethylhexyl)phthalate and 100 parts of the same resin is so viscous 5 days after preparation that it will be more difficult to obtain a uniform continuous coating therewith.

EXAMPLE IV

A plastisol containing 100 parts of a vinyl chloride-vinyl acetate (5% by weight) copolymer having an average particle size of about 1.0 micron, 125 parts of di-(2-ethylhexyl)phthalate and 13 parts of HBHC "A" will have only a slightly increased viscosity 5 to 6 days after preparation, whereas a plastisol coating in which the HBHC "A" is omitted will be much more viscous and hence difficult to handle.

EXAMPLE V

A plastisol containing 100 parts of the dispersion type PVC resin of Example II, 80 parts of butyl benzyl phthalate, and 10 parts of HBHC "B" and a plastisol containing 100 parts of PVC and 80 parts of butyl benzyl phthalate are prepared. Both plastisols pour satisfactorily when prepared, but only the first plastisol will pour satisfactorily 7 days after preparation.

EXAMPLE VI

A plastisol is prepared which contains 200 parts of the PVC dispersion type resin described in Example II and 160 parts of 2-ethylhexyl diphenyl phosphate. The plastisol composition is divided into two equal portions. To the first is added 10 parts of HBHC "B." Both plastisols pour satisfactorily when fresh. Seven days later the plastisols are tested for fluidity. Only the plastisol containing HBHC "B" pours satisfactorily for mold filling.

EXAMPLE VII

Plastisol compositions are prepared which contain 100 parts of a dispersion type PVC resin having an average particle size of 2.5 microns, the quantities of di-(2-ethylhexyl)phthalate and HBHC compound as tabulated below:

*Table III*

| Composition | di(2-ethylhexyl) phthalate parts | HBHC Compound of Example |
|---|---|---|
| 1 | 40 | 20 parts "C." |
| 2 | 75 | 10 parts "C." |
| 3 | 65 | 5 parts "C." |
| 4 | 75 | 12 parts "D." |
| 5 | 50 | 10 parts "E." |
| 6 | 75 | 8 parts "E." |
| 7 | 75 | 3 parts "E." |
| 8 | 100 | 5 parts "E." |
| 9 | 80 | 15 parts "F." |
| 10 | 75 | 10 parts "G." |
| 11 | 65 | 12 parts "H." |
| 12 | 75 | 8 parts "J." |
| 13 | 75 | 8 parts "K." |
| 14 | 100 | 10 parts "L." |
| 15 | 100 | 10 parts "M." |
| 16 | 75 | 5 parts "N." |
| 17 | 75 | 12 parts "O." |
| 18 | 65 | 15 parts "O." |
| 19 | 75 | 5 parts "O." |
| 20 | 75 | |

The viscosity of compositions 1 through 19 of the above table are within a usable range 7 to 14 days after preparation, whereas, in about 4 days the viscosity of composition 20 is such that it is difficult to pour the plastisol into a mold, and it is also difficult to obtain a uniformly thick continuous coating in a dip molding operation.

Similar results are obtained when the di-(2-ethylhexyl)phthalate plasticizer in each composition above is replaced by an equal amount of diisodecyl adipate, dioctyl adipate, butyl benzyl phthalate, 2-ethylhexyl diphenyl phosphate and tri-(2-ethylhexyl)phosphate.

It is apparent from the foregoing results that the viscosity of a plastisol of a vinyl halide-containing dispersion grade resin and a plasticizer can be kept within usable limits by the addition thereto of from about 1 to about 25 parts of HBHC compound per hundred parts by weight of resin. Preferably, from 5 to 15 parts of HBHC per hundred parts by weight of resin are employed.

Various pigments, colors, fillers and resin stabilizers may be employed in the compositions of the present invention.

While in the instant invention the high boiling liquid aromatic hydrocarbon mixtures have been described with respect to certain embodiments, namely the high boiling residue or fraction obtained from an alkylation product resulting from the condensation of benzene with a mono-chloride of a paraffin base kerosene fraction, or preferably, from the alkylation product resulting from the condensation of benzene with a propylene polymer containing 9 to 18 carbon atoms, which respectively provide a monophenyl branched chain alkane containing a carbon atom content in the range of 14 to 24 carbon atoms and characterized by a carbon atom chain length attached to a ring carbon atom of the aryl nucleus of 6 to 12 carbon atoms. It is to be understood that the invention is not so limited.

The high boiling liquid aromatic hydrocarbon mixtures produced when benzene is the starting material in the alkylation reaction are preferred; however, the high boiling fractions obtained when toluene and xylene are used in place of benzene are also embraced within the broader aspects of this invention.

Similarly, the high boiling fraction obtained from the alkylation product resulting from the reaction of benzene and a straight chain mono-olefinic hydrocarbon containing from 9 to 18 carbon atoms (or mixtures thereof containing an average of 9 to 18 carbon atoms) at low temperatures and in the presence of an alkylation catalyst are also within the broad aspects of this invention. For example, when 1-dodecene is reacted with benzene (slight excess) at 30–35° C. in the presence of aluminum chloride and HCl; and the excess benzene, intermediate fraction and dodecyl benzene fraction are removed by distillation, there remains a high boiling liquid aromatic hydrocarbon mixture which is compatible with the cellulose ethers described herein. Other straight chain mono-olefins such as decene, undecene, tridecene, tetradecene and octadecene, for example, may be employed in place of the 1-dodecene in the above described process.

Other conventional processes for obtaining the mono-alkyl benzene and thusly, the high boiling residue, are described in the patent and technical literature relating to the production of sulfonated detergents and surface active agents, e.g. see U.S. Letters Patent 2,456,119 and 2,477,383.

In the specification and the appended claims, such terms as "tetramer" and "pentamer," for example, are used alternatively to the terms "$C_{12}$ polymer" and "$C_{15}$ polymer" respectively. It is to be understood that the propylene polymerization reaction does not proceed so smoothly or accurately as the yield only exact tetra or penta-multiples of the olefin feed but that such terms are used in this specification, are meant to be descriptive of those hydrocarbons present in the polymer product and boiling respectively within the $C_{12}$ and $C_{15}$ olefin boiling ranges, which ranges embrace the boiling points of various isomeric $C_{12}$ and $C_{15}$ polymer hydrocarbons present therein.

This application is a continuation-in-part of United States Serial Number 400,370, filed December 24, 1953.

What is claimed is:

1. An improved plastisol which comprises a vinylidene polymer selected from the group consisting of homopolymers of vinylidene halide and copolymers of vinylidene halide with ethylenically unsaturated monomers copolymerizable therewith containing at least 80% by weight of vinylidene halide, homopolymers of vinyl halide and copolymers of vinyl halide with ethylenically unsaturated monomers copolymerizable therewith containing at least 80% by weight of vinyl halide dispersed in from about 25 to about 150 parts per 100 parts by weight of polymer of a primary liquid plasticizer therefor and from about 1 to about 25 parts per 100 parts by weight of polymer of a high boiling liquid aromatic hydrocarbon mixture, having a boiling point above the boiling point of nonylbenzene, obtained as the high boiling residue from the alkylation product of an aromatic hydrocarbon of the benzene series with an alkylating agent selected from the group consisting of olefins and alkyl halides containing from 9 to 18 carbon atoms.

2. An improved plastisol which comprises a vinyl halide homopolymer dispersed in from about 25 to about 150 parts per 100 parts by weight of polymer of a primary liquid organic plasticizer therefor, which is a non-solvent for the polymer at room temperature and a solvent at elevated temperatures, and from about 1 to about 25 parts per 100 parts by weight of polymer of a high boiling liquid aromatic hydrocarbon mixture, having a boiling point above the boiling point of nonylbenzene, obtained as the high boiling residue from the alkylation product of an aromatic hydrocarbon of the benzene series with an alkylating agent consisting of olefins containing from 9 to 18 carbon atoms.

3. The composition of claim 2 wherein the alkylating agent is an acyclic propylene polymer which contains from 9 to 18 carbon atoms.

4. The composition of claim 3 wherein the acyclic propylene polymer contains from 12 to 18 carbon atoms.

5. An improved plastisol which comprises polyvinyl chloride which has an average particle size in the range of 0.02 to 5.0 microns, dispersed in a liquid polybasic acid ester plasticizer therefor, the weight proportions being in the range of from 60 to 100 parts of plasticizer per 100 parts of polymer, and from about 5 to about 15 parts per 100 parts of polymer of a high boiling liquid aromatic hydrocarbon mixture, having a boiling point above the boiling point of dodecylbenzene, obtained as the high boiling residue from the alkylation product of benzene with an acyclic propylene polymer containing from 12 to 18 carbon atoms.

6. The composition of claim 5 wherein the plasticizer is a liquid diester of phthalic acid whose ester groups contain a total of at least eight carbon atoms.

7. The composition of claim 6 wherein the plasticizer is di-(2-ethylhexyl) phthalate.

8. The composition of claim 5 wherein the acyclic propylene polymer is propylene tetramer having an apparent average molecular weight within the range of 330 to 380.

9. The composition of claim 5 wherein the acyclic propylene polymer is a $C_{13}$ propylene polymer mixture having an apparent average molecular weight within the range of 380 to 450.

10. The composition of claim 5 wherein the acrylic propylene polymer is propylene pentamer.

11. The composition of claim 5 wherein the acrylic propylene polymer is propylene hexamer.

12. The method of preparing a plastisol having a reduced tendency to increase in viscosity which comprises dispersing a vinylidene polymer, selected from the group consisting of vinylidene halide homopolymers, copolymers of vinylidene halide with ethylenically unsaturated monomers copolymerizable therewith containing at least 80% by weight of vinylidene halide, vinyl halide homopolymers, and copolymers of vinyl halide with ethylenically unsaturated monomers copolymerizable therewith containing at least 80% by weight of vinyl halide, in a mixture comprising from about 25 to about 150 parts per 100 parts by weight of polymer of a primary liquid plasticizer for said polymer and from about 1 to about 25 parts per 100 parts by weight of polymer of a high boiling liquid aromatic hydrocarbon mixture, having a boiling point above the boiling point of nonylbenzene, obtained as the high boiling residue from the alkylation product of an aromatic hydrocarbon of the benzene series with an alkylating agent selected from the group consisting of olefins and alkyl halides containing from 9 to 18 carbon atoms.

13. The method of preparing a plastisol having a reduced tendency to increase in viscosity which comprises dispersing a vinyl halide homopolymer in a mixture comprising a primary liquid organic plasticizer which is a non-solvent for the polymer at room temperature and a solvent at elevated temperatures, and a high boiling liquid aromatic hydrocarbon mixture, having a boiling point above the boiling point of nonylbenzene, obtained as the high boiling residue from the alkylation product of an aromatic hydrocarbon of the benzene series with an alkylating agent consisting of olefins containing from 9 to 18 carbon atoms, the weight proportions being within the range of from about 25 to about 150 parts of plasticizer per 100 parts of polymer and from about 1 to about 25 parts of high boiling liquid aromatic hydrocarbon mixture per 100 parts of polymer.

14. The method of claim 13 wherein the alkylating agent is an acyclic propylene polymer which contains from 9 to 18 carbon atoms.

15. The method of claim 14 wherein the acyclic propylene polymer contains from 12 to 18 carbon atoms.

16. The method of preparing a plastisol having a reduced tendency to increase in viscosity which comprises dispersing polyvinyl chloride which has an average particle size in the range of 0.02 to 5.0 microns, in a mixture comprising a liquid polybasic acid ester plasticizer for said polymer, the weight proportions being within the range of from 60 to 100 parts of plasticizer per 100 parts of polymer, and from about .5 to about 15 parts per 100 parts of polymer of a high boiling liquid aromatic hydrocarbon mixture, having a boiling point above the boiling point of dodecylbenzene, obtained as the high boiling residue from the alkylation product of benzene with an acylic propylene polymer containing from 12 to 18 carbon atoms.

17. The method of claim 16 wherein the plasticizer is a liquid diester of phthalic acid whose ester groups contain a total of at least eight carbon atoms.

18. The method of claim 17 wherein the plasticizer is di-(2-ethylhexyl) phthalate.

19. The method of claim 18 wherein the acyclic propylene polymer is propylene tetramer having an apparent average molecular weight within the range of 330 to 380.

References Cited in the file of this patent
UNITED STATES PATENTS

| | | |
|---|---|---|
| 2,615,858 | Winkler | Oct. 28, 1952 |
| 2,698,280 | Hersberger et al. | Dec. 28, 1954 |